United States Patent [19]

Yamashita et al.

[11] Patent Number: 4,723,312

[45] Date of Patent: Feb. 2, 1988

[54] LIGHT EMITTING DIODE DRIVER CIRCUIT

[75] Inventors: Kiichi Yamashita, Kanagawa; Katsuyoshi Harasawa, Tokyo; Yoshitaka Takasaki, Tokorozawa, all of Japan

[73] Assignee: Hitachi, Ltd., Japan

[21] Appl. No.: 769,971

[22] Filed: Aug. 27, 1985

[30] Foreign Application Priority Data

Aug. 31, 1984 [JP] Japan ................................ 59-180518

[51] Int. Cl.[4] ............................................... H04B 9/00
[52] U.S. Cl. ........................................ 455/613; 372/38
[58] Field of Search ............... 455/603, 613, 617, 618, 455/611; 372/38, 25, 26, 29, 33; 307/296 A; 250/495.1

[56] References Cited

U.S. PATENT DOCUMENTS 4,375,106  2/1983  Voll ...................................... 455/603

FOREIGN PATENT DOCUMENTS 2552285  3/1985  France ................................. 455/613
58-107693  6/1983  Japan .................................... 372/38
59-35494  2/1984  Japan .................................... 372/38

OTHER PUBLICATIONS

Yanai et al—"Direct Modulation of a DH Laser"—IEEE Jour. of Quantum Electronics–vol. QE-11, No. 7, Jul. 1975, pp. 519–524.

*Primary Examiner*—Joseph A. Orsino, Jr.
*Attorney, Agent, or Firm*—Antonelli, Terry & Wands

[57] ABSTRACT

A high-speed light emitting diode driver circuit for optical communication systems, in which an impedance circuit is provided between the collector and emitter of a drive transistor, and another impedance circuit is provided on the emitter side. The light emitting diode is connected to the collector side of the drive transistor. The light emitting diode is driven by an input pulse signal applied to the base of the drive transistor.

4 Claims, 4 Drawing Figures

LIGHT EMITTING DIODE DRIVER CIRCUIT

BACKGROUND OF THE INVENTION

1. Field of the Invention

The present invention relates to an LED (light emitting diode) driver circuit for high-speed optical communication systems and in particular to an LED driver circuit which is capable of significantly reducing the fall time of a long-wavelength LED.

2. Description of the Prior Art

A long-wavelength light emitting diode (hereafter abbreviated as LED) can operate at high-speed exceeding 100 Mb/s. In recent years, therefore, the LED seems to be promising as an optical source for LANs (Local Area Networks), computer networks, and interoffice communication systems with a repeater spacing of 1 km to 2 km. Unfortunately, unlike short-wavelength LEDs, long-wavelength LEDs have an unfavorable performance characteristic in that the fall time is two to three times as long as the rise time. For example, when long-wavelength LEDs have the radiation layers with impurity concentration of $5 \times 10^{18} cm^{-3}$, those fall time are generally 4 to 5 ns. Then, those rise time are typically 1.5 ns. For practical use of long-wavelength LEDs, therefore, reduction of the fall time is a significant technical subject.

FIG. 1 shows a circuit configuration of LED driver circuit of the prior art. Such a driver is described in Japanese Utility Model publication No. 7790/84. In general, reduction of the fall time of the LED can be achieved by fast discharging of the electric charge stored in the parasitic capacitance of the LED, during the cutoff state of the LED. Based on this viewpoint, a circuit configuration illustrated in FIG. 1 has been proposed. A series circuit consisting of a resistor 4 and a capacitor 5 is connected to the collector of a transistor 1 and in parallel to an LED 2 and to a resistor 3. The resistors 3 and 4 as well as the capacitor 5 are used to discharge electronic charge stored in the parasitic capacitance of the LED 2. In this case, the time constant required for discharging the electric charge is almost determined by the product of the parasitic capacitance of the LED 2 of the parallel resistance of the resistors 3 and 4. The smaller the values of the resistors 3 and 4 are, the shorter fall time the LED 2 will have. If the resistors 3 and 4 have small values, however, almost all the collector current of the transistor 1 flows through the resistors 3 and 4 when a pulse signal supplied from a terminal 8 rises up. That is to say, no current flows through the LED 2. Therefore, the desired improvement effect of the rise time due to a resistor 6 and a capacitor 7 is not attained. On the contrary, the rise time is significantly degraded. In addition, since a large current flows through the resistor 3 even in the steady state of the pulse signal, the transistor 1 is required to supply not only the current for driving the LED 2 but also the undesirable current for driving the resistor 3. In conclusion, it is difficult to reduce both the rise and fall times of the LED 2 in the circuit configuration of the prior art as illustrated in FIG. 1.

SUMMARY OF THE INVENTION

An object of the present invention is to provide an LED driver circuit which is capable of reducing fall times of LEDs without sacrificing the rise time thereof.

In accordance with one aspect of the present invention, therefore, impedance circuits are connected between the collector and emitter of a driving transistor, and between the emitter and ground for discharging electric charges stored in the parasitic capacitance of the LED, respectively.

By using this circuit configuration, the rise and fall times of the LED can be improved by two to three times as compared with the prior art. If the present invention is applied for grading-up the modulation speed of long-wavelength LEDs, therefore, long-wavelength LEDs will be very promising as an optical source for high-speed communication systems with transmission bit rates exceeding 100 Mb/s.

DESCRIPTION OF THE PREFERRED EMBODIMENT

Figure 1:
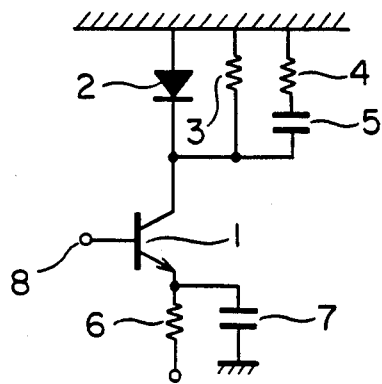
FIG. 1 shows a configuration of an LED driver circuit of the prior art.
Figure 2:
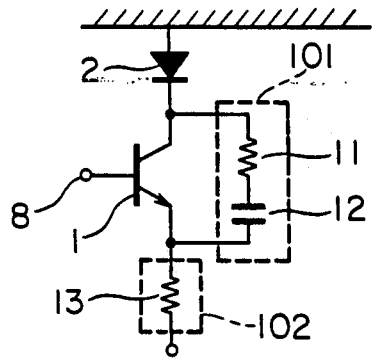
FIG. 2 shows an embodiment of the present invention.

An embodiment of the present invention will now be described by referring to FIG. 2. In this embodiment, an impedance circuit 101 is connected between the collector and emitter of the drive transistor 1. The impedance circuit 101 comprises a series circuit of a resistor 11 and a capacitor 12. And an impedance circuit 102 connected between the emitter and AC ground comprises a resistor 13. The operation principle of the circuit illustrated in FIG. 2 will now be described in detail. At first, operation during the negative-going transition of an LED drive current signal will be described. When the input pulse signal has changed from its high level to its low level, the potentials at the base and emitter of the transistor 1 are lowered. Since the difference between the base and the emitter voltages is nearly constant the emitter potential descends in this case in response to the base potential. On the other hand, the collector potential rises upward because the collector current decreases according to the emitter potential descent. Accordingly, the voltage across the impedance circuit 101 increases and the capacitor 12 are rapidly charged. Since this charge current is supplied by the discharge of electric charge stored in the parasitic capacitance of the LED 2, the fall time is significantly improved. The time constant required for discharging the electric charge becomes shorter as the values of the resistors 11 and 13 are decreased, resulting in a significant improvement effect.

Next, the operation when the input pulse signal has changed from its low level to its high level will now be described. When the input pulse signal has risen up, the emitter potential of the transistor 1 also rises up. Accordingly, the collector current increases according to the emitter potential rise. By increase of the collector current, the LED 2 is brought into the operation state. Since the collector potential of the transistor 1 is lowered at this time, the voltage across the impedance circuit 101 is decreased. Due to this decrease in voltage, the discharge current of electric charge stored in the capacitor 12 forms a part of the collector current. By suitably selecting the value of the capacitor 12, however, the discharge current can be made negligible as compared with the drive current flowing through the LED 2. That is to say, the collector current is mostly supplied from the LED 2 during the positive-going transition of drive current signal. Accordingly, the rise time of the LED 2 is not affected by the impedance circuit 101. By connecting either a capacitor or a series circuit consisting of a capacitor and a resistor to the resistor 13 within the impedance circuit 102, therefore, the rise time can also be improved independently of the fall time.

Figure 3:
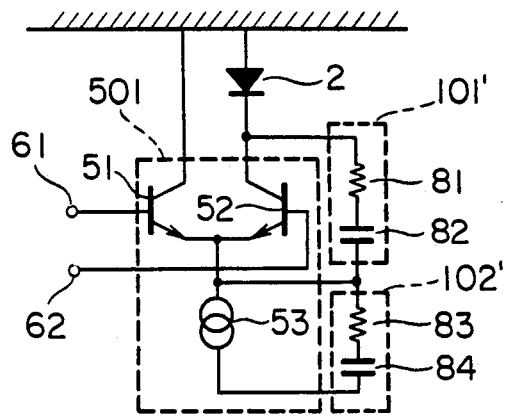
FIG. 3 shows another embodiment of the present invention.

FIG. 3 shows the circuit configuration of another embodiment of the present invention. In FIG. 3, a current switch 501 is used as a current driver circuit for the LED 2. The current switch includes a constant current source 53 and transistors 51 and 52 having emitters connected together. The discharge circuit includes impedance circuits 101' and 102'. The impedance circuit 101' includes a resistor 81 and a capacitor 82, which are connected between the collector and emitter of the transistor 52. The impedance circuit 102' includes a resistor 83 and a capacitor 84, which are connected between the emitter of the transistor 52 and the ground terminal. The operation of the driver circuit shown in FIG. 3 will now be described briefly, because the operation principle of the embodiment illustrated in FIG. 3 is basically the same as that of the embodiment illustrated in FIG. 2. It is now assumed that pulse signals having polarities opposing each other are applied to terminals 61 and 62. When the potential of the terminal 61 assumes its high level and the potential of the terminal 62 assumes its low level, the current supplied from the constant current source 53 wholly flows through the transistor 51, the transistor 52 being brought into the cutoff state. Since no current thus flows through the LED 2, the collector potential of the transistor 52 rises up. On the other hand, the emitter potential of the transistor 52 rises up in response to the rise of the base potential of the transistor 51 which is in the operation state. However, the rise amount is half the amplitude of the input pulse signal. Since the amplitude is typically close to 0.8 V, the change in emitter potential is approximately 0.4 V. Meanwhile, the change in voltage across the LED 2 is approximately 1.5 to 2 V. Due to the resultant increase in voltage across the impedance circuit 101', a charge current flows into the capacitor 82. Since this current is generated by the electric charge stored in the parasitic capacitance of the LED 2 as described before, the fall time of the LED 2 can be improved. The impedance circuit 102' is a circuit for forming a discharge path. A smaller value of the resistor 83 and a larger value of the capacitor 84 raise the improvement effect. When the terminal 61 has turned its low level and the terminal 62 has turned its high level, the transistor 51 assumes cutoff state and the transistor assumes operation state, the optical output of the LED 2 rising up. At this time, the collector potential of the transistor 52 falls down and the emitter potential of the transistor 52 rises up. Accordingly, the voltage across the impedance circuit 101' is reduced. As a result, a discharge current of the capacitor 82 flows as a part of the collector current of transistor 52 via the capacitor 82. As described before, however, this discharge current can be neglected as compared with the collector current by suitably selecting the value of the capacitor 82. Therefore, the impedance circuits 101' and 102' have little influence on the rise operation and have an influence only on the fall operation.

Figure 4:
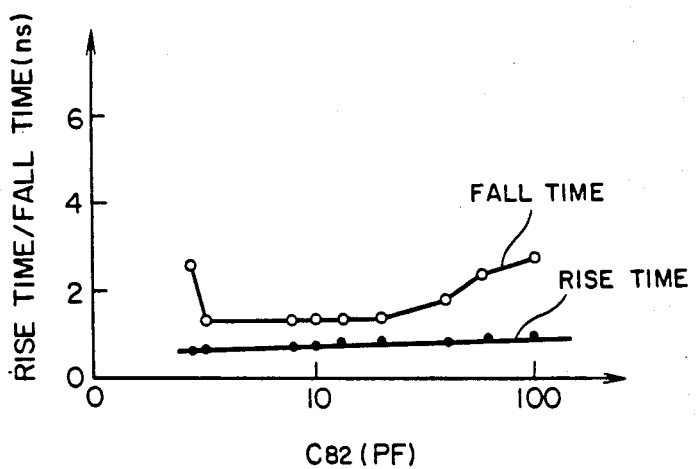
FIG. 4 shows the results of typical experiment results on the driver circuit illustrated in FIG. 3.

FIG. 4 shows experiment results on the modulation speed of a long-wavelength LED when the value $C_{82}$ of the capacitor 82 is changed in the embodiment of the present invention illustrated in FIG. 3. The long-wavelength LED used in this experiment had the radiation layer with an impurity concentration of $5 \times 10^{18} \text{cm}^{-3}$, the rise time of 1.5 ns, and the fall time of 4 ns. Resistors 81 and 83 were 5 ohms and the capacitor 84 had a value of 1000 pF. As evident from the FIG. 4, the rise time hardly changes with the value of the capacitor 82. As for the fall time, however, there exists an optimum value of the capacitor 82. When $C_{82}$ has a value in a range from 4 to 16 pF, the greatest improvement effect has been attained. At this time, the fall time is approximately 1.2 ns and the rise time is approximately 0.7 ns, resulting in speed increase of three and two times, respectively.

Further, the impedance circuit may comprise not only resistors and capacitors, but also inductors.

We claim:

1. A light emitting diode driver circuit comprising:
   a drive transistor having its collector connected to a light emitting diode, said light emitting diode having a parasitic capacitance;
   a first impedance circiut connected between the collector and emitter of said drive transistor; and
   a second impedance circuit having one end connected to the emitter of said drive transistor and the other end connected to an AC ground,
   said first and second impedance circuits serving to discharge electric charges stored in the parasitic capacitance of said light emitting diode.

2. A light emitting diode driver circuit according to claim 1, wherein said first impedance circuit comprises a series circuit of a resistor and a capacitor, and said second impedance circuit comprises a resistor.

3. A light emitting diode driver circuit comprising:
   a current switch including a pair of transistors having their emitters connected together, one of said pair of transistors having its collector connected to a light emitting diode, and a constant current source connected to the emitters of said pair of transistors;
   a first impedance circuit connected between the collector of said one transistor and said emitters of said transistors; and
   a second impedance circuit connected in parallel to said constant current source.

4. A light emitting diode driver circuit according to claim 3, wherein each of said first and second impedance circuits comprise a series circuit including a resistor and a capacitor.

* * * * *